US008416074B2

(12) United States Patent
Sadwick

(10) Patent No.: US 8,416,074 B2

(45) Date of Patent: Apr. 9, 2013

(54) SOLAR POWERED PORTABLE CONTROL PANEL

(76) Inventor: Laurence P. Sadwick, Salt Lake City, UT (US)

( * ) Notice: Subject to any disclaimer, the term of this patent is extended or adjusted under 35 U.S.C. 154(b) by 399 days.

(21) Appl. No.: 12/775,455

(22) Filed: May 6, 2010

(65) Prior Publication Data

US 2011/0115622 A1 May 19, 2011

Related U.S. Application Data

(60) Provisional application No. 61/176,434, filed on May 7, 2009.

(51) Int. Cl.

| | |
|---|---|
| ***G08B 1/08*** | (2006.01) |
| ***H01M 10/44*** | (2006.01) |
| ***G09F 1/00*** | (2006.01) |

(52) U.S. Cl.

USPC .............. 340/539.16; 340/539.26; 340/539.3; 340/600; 340/12.3; 340/538; 340/538.15; 340/12.32; 340/12.37; 320/101; 315/DIG. 4; 315/291

(58) Field of Classification Search ............. 340/539.16, 340/539.26, 539.3

See application file for complete search history.

(56) References Cited

U.S. PATENT DOCUMENTS

| | | | | |
|---|---|---|---|---|
| 6,882,128 | B1 * | 4/2005 | Rahmel et al. | 320/101 |
| 2003/0066897 | A1 * | 4/2003 | Carner et al. | 236/51 |
| 2008/0157711 | A1 * | 7/2008 | Chiang et al. | 320/101 |

* cited by examiner

*Primary Examiner* — Donnie Crosland

(74) *Attorney, Agent, or Firm* — Hamilton, DeSanctis & Cha

(57) ABSTRACT

A solar powered portable control panel is disclosed herein for wirelessly controlling one or more lights or other devices. An embodiment of the control panel includes a solar panel, a regulator connected to the solar panel, a power storage device connected to the regulator, a wireless transceiver, a controller connected to the power storage device, and a user interface connected to the controller. The user interface is adapted to accept control input and provide it to the controller. The controller is adapted to transmit commands on the wireless transceiver.

17 Claims, 3 Drawing Sheets

SOLAR POWERED PORTABLE CONTROL PANEL

CROSS REFERENCE TO RELATED APPLICATIONS

The present application claims priority to U.S. patent application No. 61/176,434 entitled "Solar Powered Portable Control Panel", filed May 7, 2009, the entirety of which is incorporated herein by reference for all purposes.

BACKGROUND

Portable control devices may be used for many purposes in the home or in other locations. For example, wireless portable control panels may be used to control lights, ceiling fans, televisions, stereos, etc. However, many of these devices consume power and typically require that batteries be replaced regularly.

SUMMARY

A solar powered portable control panel is disclosed herein for wirelessly controlling one or more lights or other devices. An embodiment of the control panel includes a solar panel, a regulator connected to the solar panel, a power storage device connected to the regulator, a wireless transceiver, a controller connected to the power storage device, and a user interface connected to the controller. The user interface is adapted to accept control input and provide it to the controller. The controller is adapted to transmit commands on the wireless transceiver.

In an embodiment of the control panel, the user interface comprises a lighting control interface.

In an embodiment of the control panel, the lighting control interface comprises a dimming interface.

In an embodiment of the control panel, the lighting control interface comprises a multi-color lighting control interface.

An embodiment of the control panel also includes a display, and the controller is adapted to display lighting status on the display.

An embodiment of the control panel also includes a light sensor, and the controller is adapted to generate lighting control commands at least in part based on an ambient light level measured by the light sensor.

In an embodiment of the control panel, the user interface comprises a temperature control interface.

An embodiment of the control panel also includes a temperature sensor, and the controller is adapted as an HVAC controller to read an ambient temperature from the temperature sensor and to transmit the ambient temperature.

In an embodiment of the control panel, the controller is adapted to transmit temperature settings commands.

In an embodiment of the control panel, the controller is adapted to take priority as a master HVAC controller in a group of control panels with temperature sensors.

In an embodiment of the control panel, the user interface includes a touch sensitive display screen and a graphical user interface.

In an embodiment of the control panel, the controller is adapted to store customized settings.

In an embodiment of the control panel, the controller is adapted to store multiple user preferences.

In an embodiment of the control panel, the controller is programmable to add additional devices which can be controlled by the control panel.

In an embodiment of the control panel, the controller is adapted to receive a notice of error conditions in a remote device and to transmit a user alert of the error conditions.

An embodiment of the control panel also includes a display, and the controller is adapted to receive and display information from a remote device on the display such as voltage, current, power, phase, watthours, power factor, VA, and lead-lag.

In an embodiment of the control panel, the controller is adapted to receive electricity rates and to customize the commands based on the electricity rates to reduce electricity costs.

In an embodiment of the control panel, the solar panel may be angled to maximize light reception.

In an embodiment of the control panel, the user interface is detachable.

Another embodiment of a control panel includes a solar panel, a regulator connected to the solar panel, a power storage device connected to the regulator, a wireless transceiver, a controller connected to the power storage device, a temperature sensor connected to the controller, a light sensor connected to the controller, and a user interface connected to the controller. The user interface is adapted to accept multi-color dimming light control input. The controller is adapted to generate light control commands based in part on the user interface and in part on an ambient light level measured by the light sensor. The user interface is also adapted to accept temperature control input. The controller is also adapted to generate temperature control commands based in part on the user interface and in part on an ambient temperature measured by the temperature sensor and on a remote ambient temperature measured by a remote control panel, and to transmit the light control commands and the temperature control commands on the wireless transceiver.

In another embodiment of the present invention, control and or monitor signals are sent to an additional unit that is connected to the power lines and the commands sent from the present solar powered invention are transmitted via the power lines to the intended device to be controlled. In a similar fashion, monitoring information can be sent to and from the present solar powered remote transceiver invention via the power lines.

The present invention can be used with a holster that provides additional solar power to power and charge up the remote. Such a holster can be designed to be both attractive and decorative while providing power to the remote unit. Such a holster can also have the appearance of a conventional "wall" dimmer or light control.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

Figure 1:
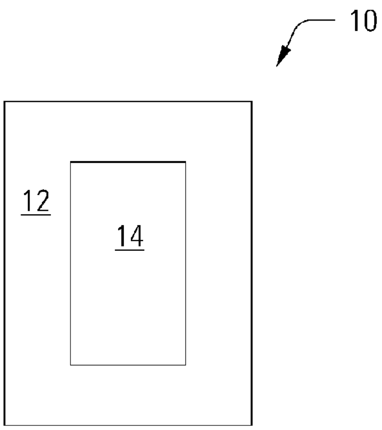
FIG. 1 depicts a solar powered portable control panel.
Figure 2:
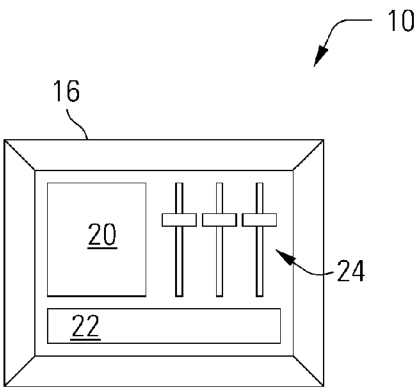
FIG. 2 depicts another embodiment of a solar powered portable control panel.

The drawings and description, in general, disclose various embodiments of a solar powered portable control panel that may be used to wirelessly control one or more devices or systems, and which is either fully or partially solar powered by one or more solar cells on the panel. Any device may be controlled or otherwise interacted with by the solar powered portable control panel. The control panel may be used to transmit information to a device, such as control data to adjust the state of the device, and/or to receive information from the device, such as to receive status information from the device and to display the status information on a display on the control panel. The control panel may be located in any desired location, such as hanging on a wall or lying on any surface, powered at least in part by the ambient light. As illustrated in FIG. 1, the control panel 10 may include one or more solar cells 12 to power the panel 10 and a user interface area 14. In another embodiment illustrated in FIG. 2, the control panel 10 may include a decorative frame 16, a display 20, a solar cell 22 and one or more input devices such as a slider or group of sliders 24. The control panel 10 is not limited to any particular type of solar cell, display, or input devices. For example, input devices may include passive physical controls such as sliders, knobs, buttons, switches, etc., or may include a graphical user interface on a touch sensitive display, or any other suitable devices for receiving input from a user or other source. The control panel 10 may include a display if desired, including status lights, a graphical display panel such as an LCD, or any other suitable device for presenting information to a user.

The control panel 10 may be used to control or receive status information from any type of device. In one embodiment, the control panel 10 is used to control one or more lights, to turn them on and off, to dim them and control the intensity of the light output, and/or to control the color from the lights. For example, given a group of sliders 24 or other input devices in a user interface, a custom color may be selected by adjusting various color components such as in a red-green-blue (RGB) system, a cyan-magenta-yellow-black (CMYK) system, or any other color system. The control panel 10 may be adapted to store custom color, light intensity and other settings, which may further be organized by user in a multi-user system.

In another embodiment, the control panel may be used to control a heating and cooling system such as a heating, ventilating, and air conditioning (HVAC) system. For example, the control panel 10 may act as a thermostat for a heating/cooling system, either as the sole thermostat for a residence or as part of a group of thermostats acting in concert to control the HVAC system of a residence, commercial facility or other types of facilities. Multiple thermostat control panels working together may be prioritized, with this prioritization taking place at a central interface such as a web browser or a computer via a number of different interfaces, or a dedicated master controller or a set of individually autonomous but interacting controllers, or by making a particular thermostat take priority or join a particular priority group via the user interface on that thermostat. The solar powered thermostat has a temperature monitoring device that reports the temperature at the location of the solar powered thermostat to a heating/cooling system controller that adjusts the temperature and/or output of the heating/cooling system based at least in part on the temperature at the location of the solar powered thermostat. Having multiple thermostats, solar powered or otherwise, working together, enables temperature monitoring at various locations in a residence or other facility over time, for example to determine the temperature variation over time in the garage, attic, basement, main living areas, near water pipes coming into the house, next to windows, doors, etc.

The control panel 10 may also configured as a programmable universal remote control capable of controlling any suitable devices such as televisions, audio/visual equipment, ceiling fans, etc.

The control panel 10 may have a rechargeable storage device such as a battery or capacitor that is charged by the solar panel, so that the control panel 10 continues to operate under low ambient light conditions.

Figure 3:
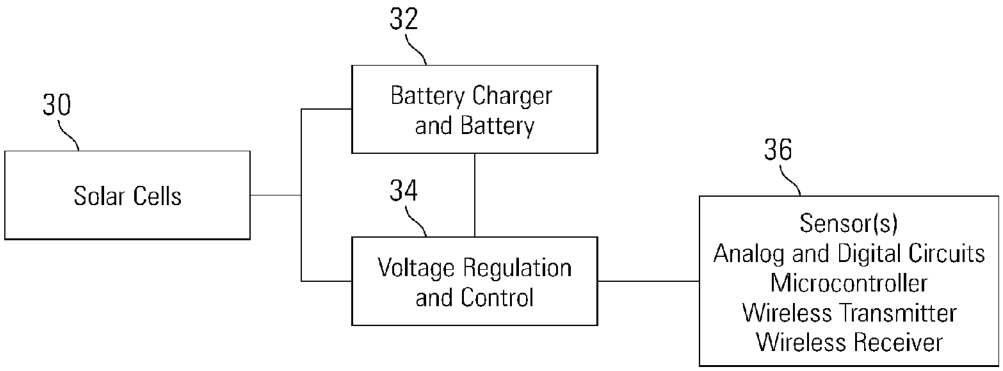
FIG. 3 depicts a block diagram of a solar powered portable control panel.

One embodiment of the control panel 10 is illustrated in block diagram form in FIG. 3. One or more solar cells 30 in the control panel 10 are connected to a battery charger and battery 32 and to a voltage or current regulator and controller 34 to provide power to the control panel 10. The control panel 10 may also include one or more sensors 36, analog and/or digital circuitry related to the user interface of the control panel 10, generating and transmitting control information to a device from the control panel 10, or receiving, processing and displaying status information from the device on the control panel 10. The control panel 10 may also include a microcontroller, microprocessor or other control circuitry, a wireless transmitter, and a wireless receiver. The microcontroller and/or microprocessor may be used to implement a user interface, receive and process user input and sensor data, generate commands to be sent to devices under control based on user input and sensor data, etc. Control circuitry may also include state machines, digital logic, analog and digital logic, application specific integrated circuits (ASICs), gate arrays, configurable logic devices (CLDs), etc.

Figure 4:
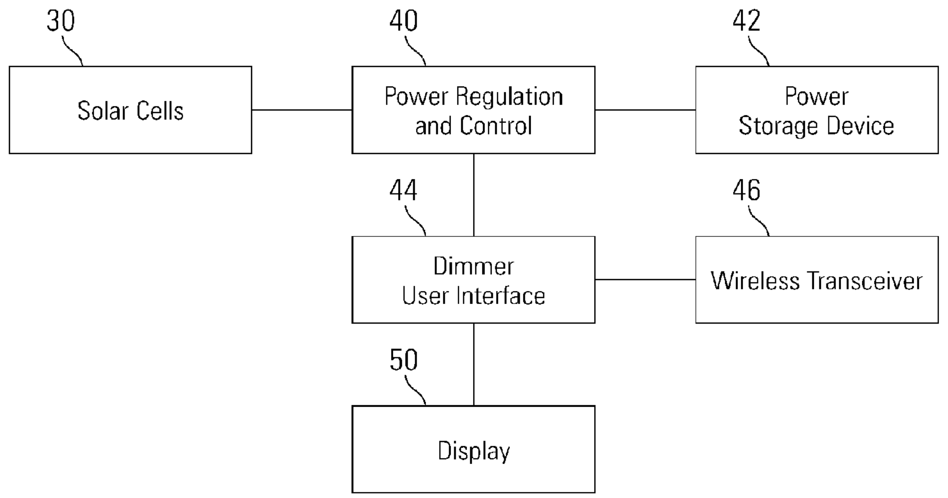
FIG. 4 depicts a block diagram of another embodiment of a solar powered portable control panel.

Another embodiment of the control panel 10 is illustrated in block diagram form in FIG. 4. One or more solar cells 30 in the control panel 10 are connected to power regulation and control circuitry 40 and to a power storage device 42 such as a battery or other storage device. The control panel 10 includes a light dimming user interface 44, a wireless transceiver 46 and a display 50.

Figure 5:
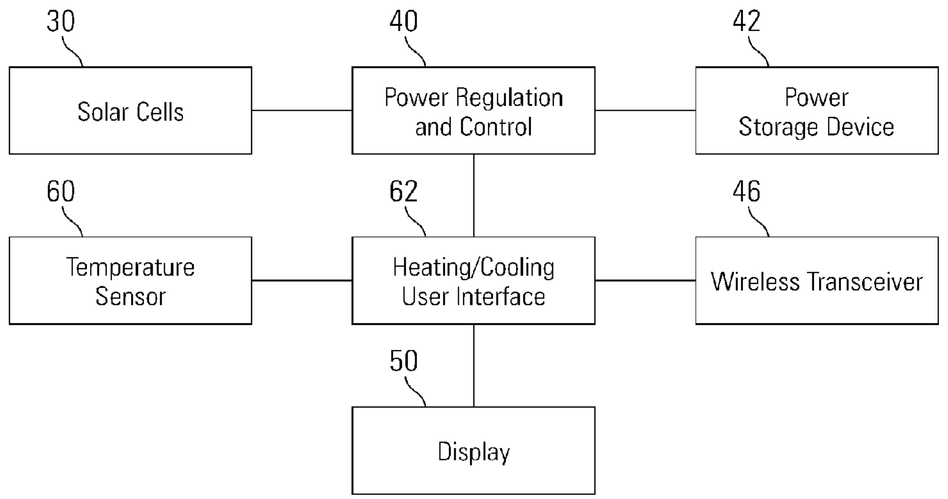
FIG. 5 depicts a block diagram of another embodiment of a solar powered portable control panel.

Another embodiment of the control panel 10 is illustrated in block diagram form in FIG. 5. One or more solar cells 30 in the control panel 10 are connected to power regulation and control circuitry 40 and to a power storage device 42 such as a battery or other storage device. The control panel 10 includes a temperature sensor 60, a heating/cooling user interface 62, a wireless transceiver 46 and a display 50.

The solar powered portable control panel 10 is not limited for use in controlling or interacting with any particular device, and may be adapted for use with any device or system having a wireless interface.

Figure 6:
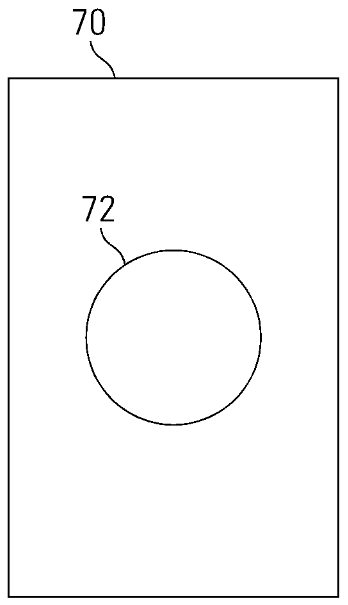
"FIG. 6 depicts a control panel with a solar panel wall plate and a dimming knob."

Referring now to FIG. 6, the control panel can replace a standard wall dimmer or switch, and may have, for example, a solar panel wall plate 70 with a dimming knob 72, or any other suitable configuration. Features of various embodiments are discussed below, and need not all be included in every embodiment. For example, basic and advanced versions of the control panel may be provided. The panel may be designed to work with any type of resistive or switching load no matter how low the power or current is. It can use an isolated design so that wiring for conventional single wire dimmer systems can be used. It can use battery, motion/vibration, solar and/or other energy sources and/or a combination of these energy sources if needed to power the dimmer. It can be very simple or very complex, and can support multiple user settings and Max/Min settings. For example, the solar powered portable control panel and/or an associated dimmer may be configured with a maximum current limit, for either or both steady state and inrush currents. If the limit is exceeded, the supply current may be shut down either immediately or after some duration for which the current, either peak or average, or both exceeds the maximum value set, the user may be alerted by an audible sound such as a buzzer or alarm or by flashing the lamp being dimmed, or by an email, text message, phone call, web alert or other message to the user, etc. Thus, if an error is detected in a device being controlled by the control panel, the error condition may be transmitted to the control panel and then reported to the user.

The control panel may also be used as an on/off switch with no dimming (i.e., 100% (on) or 0% (off)). The control panel may be adapted to support wired or wireless interfaces. It may be adapted to monitor all electrical parameters including, but not limited to, voltage, current, power, phase, watthours, power factor, VA, lead-lag, dynamic power factor, etc. The control panel may be adapted to control dimming or switching state remotely in a variety of diverse ways. The control panel may be adapted to schedule usage and to adapt to electricity rate schedules, etc. The control panel may be adapted to accept input from numerous and diverse sources, locations, types, etc. The control panel may be adapted to accept analog data, digital data, mixed data, etc. The control panel may be adapted to measure ambient light, ambient temperature, and to control associated lights or HVAC systems accordingly. The control panel may be adapted to communicate with a central controller or other units including dimmers/switches and sensors (e.g. motion, temperature, light, etc.) The control panel may have detachable dimmer and control functions that can be connected to and disconnected from the faceplate, with the solar panel remaining with the faceplate and the detached control panel containing rechargeable energy storage device(s). The control panel may be adapted to use decorative solar cells/panels that can be "tilted"/angled, either manually or automatically, to maximize the radiant light energy falling on/intercepted by the solar cells/panels. The tilting/angling may be done either manually or automatically, for example using a small motor. If performed automatically, the controller in the control panel may be provided with a light seeking algorithm to adjust the panels until the orientation providing the maximum radiant light energy is identified. Mirrors may be used to increase light energy content falling on the solar cells. The control panel may be adapted to use energy storage devices such as batteries and/or capacitors to harvest the extra energy/power from the solar cell/panels. The control panel may be adapted to completely isolate the power supply and run off of other sources of energy including batteries, fuel cells, other AC connections including a small power supply such as a "wall wart", solar power, capacitors, etc.

While illustrative embodiments have been described in detail herein, it is to be understood that the concepts disclosed herein may be otherwise variously embodied and employed.

What is claimed is:

1. A control panel comprising:
a solar panel;
a regulator connected to the solar panel;
a power storage device connected to the regulator;
a wireless transceiver;
a controller connected to the power storage device; and
a user interface connected to the controller, the user interface being adapted to accept control input and provide it to the controller, the controller being adapted to transmit commands on the wireless transceiver, wherein the user interface comprises a multi-color dimming lighting control interface.

2. The control panel of claim 1, further comprising a display, wherein the controller is adapted to display lighting status on the display.

3. The control panel of claim 1, further comprising a light sensor, wherein the controller is adapted to generate lighting control commands at least in part based on an ambient light level measured by the light sensor.

4. The control panel of claim 1, wherein the user interface comprises a temperature control interface.

5. The control panel of claim 4, further comprising a temperature sensor, wherein the controller is adapted as a HVAC controller to read an ambient temperature from the temperature sensor and to transmit the ambient temperature.

6. The control panel of claim 5, wherein the controller is adapted to take priority as a master HVAC controller in a group of control panels with temperature sensors.

7. The control panel of claim 1, wherein the user interface comprises a touch sensitive display screen and a graphical user interface.

8. The control panel of claim 7, wherein the controller is adapted to store customized settings.

9. The control panel of claim 8, wherein the controller is adapted to store multiple user preferences.

10. The control panel of claim 1, wherein the controller is programmable to add additional devices which can be controlled by the control panel.

11. The control panel of claim 1, wherein the controller is adapted to receive a notice of error conditions in a remote device and to transmit a user alert of the error conditions.

12. The control panel of claim 1, further comprising a display, wherein the controller is adapted to receive and display information from a remote device on the display, the information comprising at least one element of the group consisting of voltage, current, power, phase, watthours, power factor, dynamic power factor, VA, and lead-lag.

13. The control panel of claim 1, wherein the controller is adapted to receive electricity rates and to customize the commands based on the electricity rates to reduce electricity costs.

14. The control panel of claim 1, wherein the solar panel may be angled to maximize light reception.

15. The control panel of claim 1, wherein the user interface is detachable.

16. The control panel of claim 15, wherein the controller is adapted to transmit the commands on a power line.

17. A control panel comprising:
a solar panel;
a regulator connected to the solar panel;
a power storage device connected to the regulator;
a wireless transceiver;
a controller connected to the power storage device;
a temperature sensor connected to the controller;
a light sensor connected to the controller; and
a user interface connected to the controller, the user interface being adapted to accept multi-color dimming light control input, the controller being adapted to generate light control commands based in part on the user interface and in part on an ambient light level measured by the light sensor, the user interface further being adapted to accept temperature control input, the controller being adapted to generate temperature control commands based in part on the user interface and in part on an ambient temperature measured by the temperature sensor and on a remote ambient temperature measured by a remote control panel, the controller further being adapted to transmit the light control commands and the temperature control commands on the wireless transceiver.

* * * * *